(12) United States Patent
Hwang et al.

(10) Patent No.: US 12,097,754 B2
(45) Date of Patent: Sep. 24, 2024

(54) THERMAL MANAGEMENT SYSTEM

(71) Applicant: Hanon Systems, Daejeon (KR)

(72) Inventors: In-Guk Hwang, Daejeon (KR); Seong Hun Kim, Daejeon (KR); Hae-Jun Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 315 days.

(21) Appl. No.: 17/615,917

(22) PCT Filed: Jun. 3, 2020

(86) PCT No.: PCT/KR2020/007192
§ 371 (c)(1),
(2) Date: Dec. 2, 2021

(87) PCT Pub. No.: WO2020/246791
PCT Pub. Date: Dec. 10, 2020

(65) Prior Publication Data
US 2022/0288998 A1    Sep. 15, 2022

(30) Foreign Application Priority Data

Jun. 3, 2019   (KR) .................. 10-2019-0065385
Jun. 1, 2020   (KR) .................. 10-2020-0065950

(51) Int. Cl.
*B60H 1/32*   (2006.01)
*B60H 1/00*   (2006.01)

(52) U.S. Cl.
CPC ....... *B60H 1/3227* (2013.01); *B60H 1/00278* (2013.01); *B60H 1/00921* (2013.01);
(Continued)

(58) Field of Classification Search
CPC .............. B60H 1/3227; B60H 1/00278; B60H 1/00921; B60H 1/3213;
(Continued)

(56) References Cited

U.S. PATENT DOCUMENTS

2008/0173042 A1    7/2008  Matsumoto et al.
2019/0039440 A1*   2/2019  Calderone ............... F25B 41/40
(Continued)

FOREIGN PATENT DOCUMENTS

CN         1755302 A        4/2006
JP     2007118760 A  *      5/2007
(Continued)

OTHER PUBLICATIONS

Pdf is translation of foreign referecne JP-2007118760-A (Year: 2007).*

(Continued)

*Primary Examiner* — Henry T Crenshaw
*Assistant Examiner* — Kamran Tavakoldavani
(74) *Attorney, Agent, or Firm* — Norton Rose Fulbright US LLP; James R. Crawford (57) ABSTRACT

A thermal management system and, more specifically, to a refrigerant system comprising: a compressor, a first heat exchanger, an expansion valve, a second heat exchanger, and an accumulator which are connected in sequence to form a closed loop; and a connection block which connects a heat exchange medium outlet of the expansion valve to a heat exchange medium inlet of the second heat exchanger, and connects a heat exchange medium outlet of the second heat exchanger to a heat exchange medium inlet of the accumulator.

13 Claims, 9 Drawing Sheets

(52) U.S. Cl.
CPC . *B60H 1/3213* (2013.01); *B60H 2001/00307* (2013.01); *B60H 2001/00949* (2013.01)

(58) Field of Classification Search
CPC ........... B60H 2001/00307; B60H 2001/00949; B60H 1/00342; B60H 1/3229; B60H 1/3223; B60H 1/32; F25B 41/00; F25B 43/006
See application file for complete search history.

(56) References Cited

U.S. PATENT DOCUMENTS

| | | | |
|---|---|---|---|
| 2020/0290429 A1* | 9/2020 | Blatchley | B60H 1/321 |
| 2021/0031588 A1* | 2/2021 | Yahia | F25B 49/02 |

FOREIGN PATENT DOCUMENTS

| | | | |
|---|---|---|---|
| KR | 20140147365 A | 12/2014 | |
| KR | 20190016711 A | 2/2019 | |
| KR | 20190046989 A | 5/2019 | |
| KR | 20190051742 A | 5/2019 | |

OTHER PUBLICATIONS

Pdf is translation of foreign reference JP 2007118760 A (Year: 2007).*
International Search Report issued in PCT/KR2020/007192 on Sep. 3, 2020.
Office Action issued on Jul. 2, 2024 by the CIPO in the corresponding Patent Application No. 202080041448.1, with English translation.

* cited by examiner

THERMAL MANAGEMENT SYSTEM

CROSS REFERENCE TO RELATED APPLICATIONS

This application is a national phase under 35 U.S.C. § 371 of International Application No. PCT/KR2020/007192 filed on Jun. 3, 2020, which claims the benefit of priority from Korean Patent Application Nos. 10-2020-0065950 filed on Jun. 1, 2020 and 10-2019-0065385 filed on Jun. 3, 2019. The entire contents of these applications are incorporated herein by reference in their entirety.

TECHNICAL FIELD

The present invention relates to a thermal management system in which components constituting a refrigerant system for cooling of a vehicle and cooling of electronic components are modularized.

BACKGROUND ART

Recently, an electric vehicle has become prominent as a solution to implementation of environmentally-friendly technology and a problem such as energy depletion in a vehicle field.

The electric vehicle run using a motor driven by receiving power supplied from a battery or a fuel cell, and thus, emits less carbon and produces less noise. In addition, the electric vehicle is environmentally friendly because it uses a motor having more excellent energy efficiency than an existing engine.

Such an electric vehicle is provided with a thermal management system for cooling and heating for interior air conditioning and cooling of electronic components such as a driving motor, a battery, and an inverter.

The thermal management system includes a refrigerant system for interior cooling of the vehicle and cooling of the electronic components. However, in the refrigerant system, the number of components configured in order to circulate a refrigerant and the number of pipes connecting these components to each other are large, such that a process of assembling the refrigerant system is complicated and difficult. In addition, lengths of the pipes connecting the components to each other are increased, such that performance loss of the refrigerant system due to a pressure drop of the flowing refrigerant occurs.

RELATED ART DOCUMENT

Patent Document

KR 2014-0147365 A (2014 Dec. 30)

DISCLOSURE

Technical Problem

An object of the present invention is to provide a thermal management system capable of decreasing pressure loss of a refrigerant in pipes and blocks connecting components constituting a refrigerant system for interior cooling of a vehicle and cooling of electronic components to each other, improving performance of the refrigerant system, and improving assemblability by decreasing a distance between the components.

Technical Solution

In one general aspect, a thermal management system includes: a first heat exchanger heat-exchanging a heat exchange medium introduced from a compressor; an expansion valve expanding the heat exchange medium introduced from the first heat exchanger; a second heat exchanger exchanging heat between the heat exchange medium introduced from the expansion valve and a heating component; an accumulator storing the heat exchange medium introduced from the second heat exchanger and supplying the heat exchange medium to the compressor; and a connection block connecting a heat exchange medium outlet of the expansion valve and a heat exchange medium inlet of the second heat exchanger to each other and connecting a heat exchange medium outlet of the second heat exchanger and a heat exchange medium inlet of the accumulator to each other.

The heating component may include a battery or an electronic component, and the second heat exchanger may cool or heat the heating component.

The connection block may connect and communicate three or more components to and with each other.

The first heat exchanger, the expansion valve, the second heat exchanger, the accumulator, and the connection block may be modularized and formed integrally with each other.

An inlet through which the heat exchange medium is introduced and an outlet through which the heat exchange medium is discharged may be formed on a lower side of the second heat exchanger in a height direction.

The connection block may be disposed below the expansion valve in a height direction.

The accumulator may be disposed below the second heat exchanger and the connection block in a height direction.

The thermal management system may further include another connection block connecting a heat exchange medium outlet of the first heat exchanger and an inlet of the expansion valve to each other.

The thermal management system may further include: another expansion valve expanding the heat exchange medium introduced from the first heat exchanger; and an evaporator heat-exchanging the heat exchange medium introduced from another expansion valve with air supplied to an interior and sending the heat exchange medium to the accumulator.

The thermal management system may further include another connection block connecting a heat exchange medium outlet of the first heat exchanger to an inlet of the expansion valve and an inlet of another expansion valve.

The first heat exchanger may include: a water-cooled condenser primarily heat-exchanging the heat exchange medium discharged from the compressor with a coolant; and an air-cooled condenser secondarily heat-exchanging the heat exchange medium firstly heat-exchanged while passing through the water-cooled condenser with external air.

The thermal management system may further include another expansion valve connected between the water-cooled condenser and the air-cooled condenser, expanding the heat exchange medium discharged from the water-cooled condenser, and sending the expanded heat exchange medium to the air-cooled condenser.

The thermal management system may further include an internal heat exchanger exchanging heat between the heat exchange medium flowing from another connection block to another expansion valve and the heat exchange medium flowing from the evaporator to the accumulator.

Advantageous Effects

In the thermal management system according to the present invention, a distance between components constituting a refrigerant system for interior cooling of a vehicle and cooling of electronic components is decreased, such that pressure loss of a refrigerant in pipes and blocks connecting the components to each other is decreased, performance of the refrigerant system is improved, and assemblability of the components constituting the refrigerant system is improved.

In addition, the refrigerant may be prevented from being accumulated in a battery chiller, and assemblability between the battery chiller and the accumulator may be improved.

BEST MODE

Hereinafter, a thermal management system according to the present invention having the configuration as described above will be described in detail with reference to the accompanying drawings.

Figure 1:
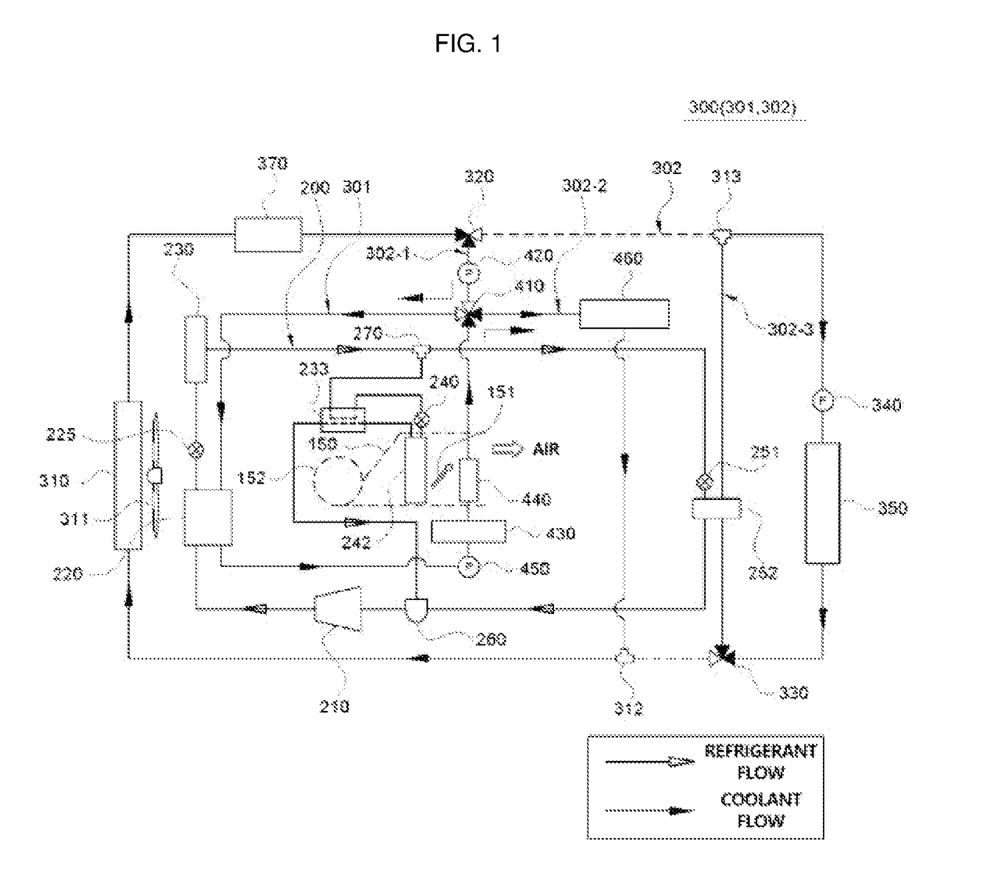
FIGS. 1 and 2 are, respectively, a configuration diagram and a perspective view illustrating an entire thermal management system including a refrigerant system and a coolant system according to an embodiment of the present invention.
Figure 2:
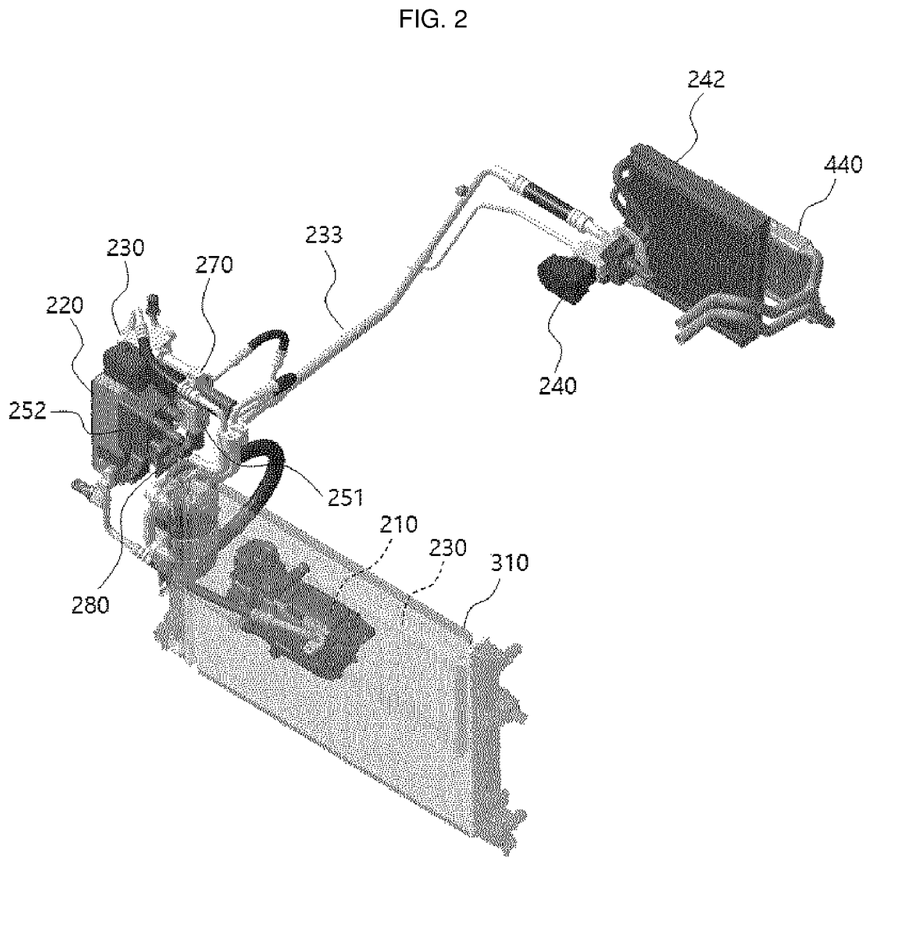
Figure 3:
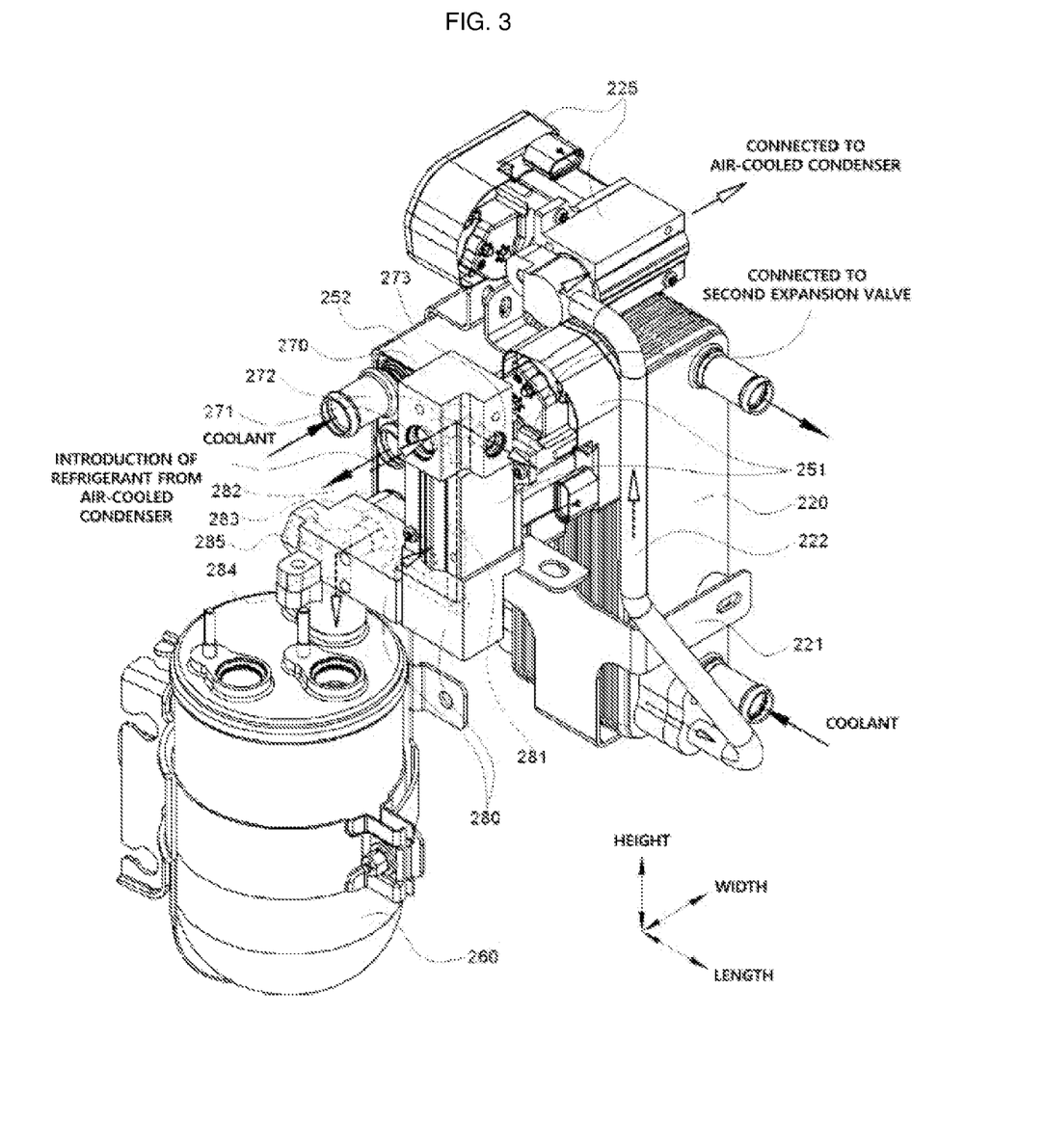
FIGS. 3 and 4 are assembled perspective views illustrating a refrigerant module of the thermal management system according to an embodiment of the present invention.
Figure 4:
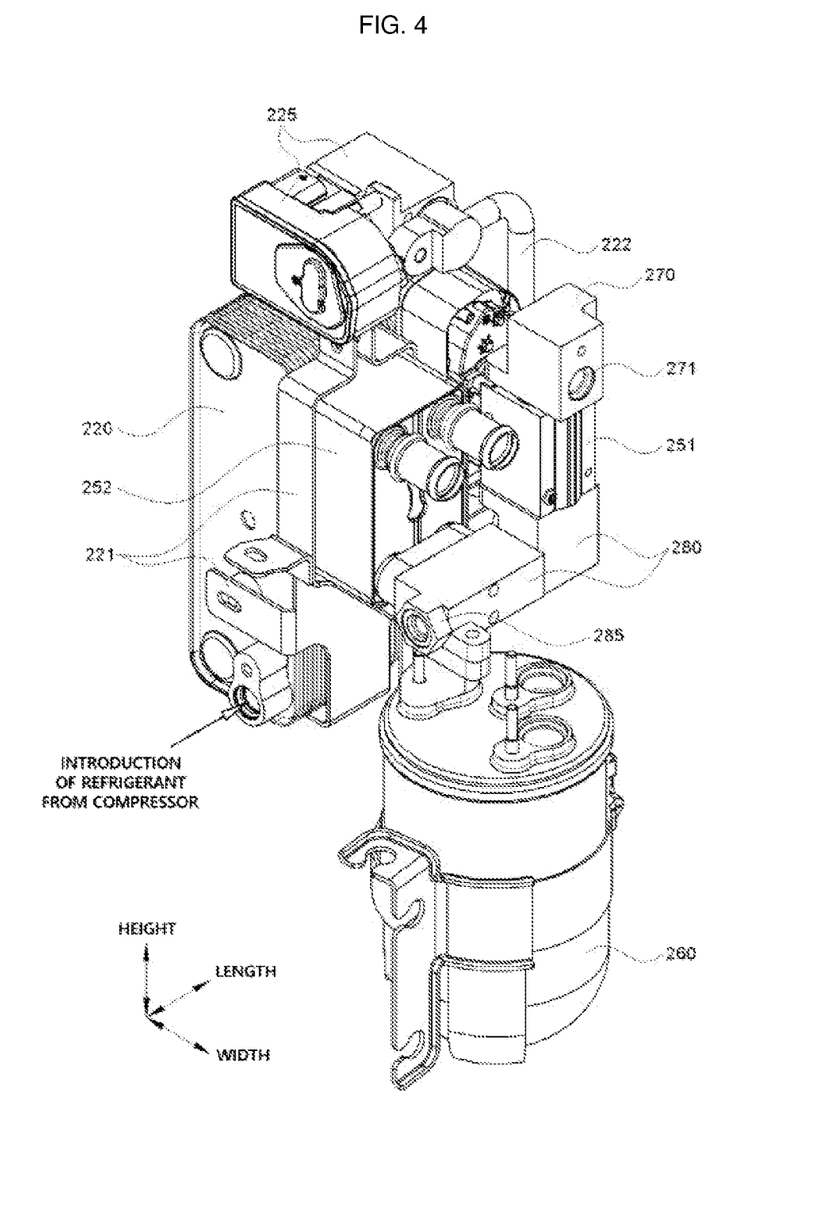

FIGS. 1 and 2 are, respectively, a configuration diagram and a perspective view illustrating an entire thermal management system including a refrigerant system and a coolant system according to an embodiment of the present invention, and FIGS. 3 and 4 are assembled perspective views illustrating a refrigerant module of the thermal management system according to an embodiment of the present invention.

As illustrated in the drawings, the thermal management system according to the present invention may be a refrigerant system 200, and the thermal management system according to the present invention may be configured to mainly include a first heat exchanger, an expansion valve, a second heat exchanger, an accumulator, and a connection block.

The first heat exchanger may be a water-cooled condenser 220 cooling a refrigerant, which is a heat exchange medium introduced from a compressor 210, using a coolant, and the water-cooled condenser 220 may be connected to a downstream side of the compressor 210 in a flow direction of the refrigerant. In addition, the first heat exchanger may further include an air-cooled condenser 230 cooling the refrigerant using external air, and the air-cooled condenser 230 may be connected to a downstream side of the water-cooled condenser 220 in the flow direction of the refrigerant. In addition, a first expansion valve 225 may be installed on a refrigerant flow path connecting a refrigerant outlet of the water-cooled condenser 220 and a refrigerant inlet of the air-cooled condenser 230 to each other. Therefore, the refrigerant introduced from the compressor 210 into the water-cooled condenser 220 may be condensed as a liquid-phase refrigerant by being cooled by heat exchange with the coolant in the water-cooled condenser 220. In addition, the refrigerant passing through the water-cooled condenser 220 may be expanded by being throttled while passing through the first expansion valve 225. In addition, the refrigerant passing through the first expansion valve 225 is introduced into the air-cooled condenser 230, and the refrigerant and the external air exchange heat with each other in the air-cooled condenser 230, such that the refrigerant may be further cooled. Here, the compressor 210 may be an electric compressor driven by receiving power, and serves to suck and compress the refrigerant and discharge the compressed refrigerant toward the water-cooled condenser 220. In addition, the first expansion valve 225 may throttle and expand the refrigerant, bypass the refrigerant, or block a flow of the refrigerant according to its operation. In addition, the air-cooled condenser 230 may serve as a condenser or an evaporator, and a function of the air-cooled condenser 230 may vary according to a role of the first expansion valve 225. That is, in a case where the refrigerant system 200 is used as an air conditioner loop, the first expansion valve 225 is completely opened to allow the refrigerant to pass therethrough, and the air-cooled condenser 230 serves as a condenser together with the water-cooled condenser 220, and the refrigerant primarily cooled while passing through the water-cooled condenser 220 may be further cooled secondarily while passing through the air-cooled condenser 230 later. In addition, in a case where the refrigerant system 200 is used as a heat pump loop, the first expansion valve 225 throttles the refrigerant, and the air-cooled condenser 230 serves as an evaporator. In addition, the air-cooled condenser 230 may be cooled or heated in an air-cooled manner by the external air.

The expansion valve may be the third expansion valve 251, and the third expansion valve 251 may be connected to a downstream side of the air-cooled condenser 230 in the flow direction of the refrigerant. In addition, the third expansion valve 251 may throttle and expand the refrigerant introduced from the air-cooled condenser 230. In this case, the third expansion valve 251 may throttle and expand the refrigerant, bypass the refrigerant, or block a flow of the refrigerant according to its operation.

The second heat exchanger may be a battery chiller 252, and the battery chiller 252 may be connected to a downstream side of the third expansion valve 251 in the flow direction of the refrigerant. In addition, the battery chiller 252 may heat-exchange the refrigerant introduced from the third expansion valve 251 with a battery 350 or an electronic component 460, which is a heating component.

The accumulator 260 serves to store the refrigerant introduced from the battery chiller 252 and then supply the refrigerant to the compressor 210. In addition, the accumulator 260 may have a refrigerant inlet connected to a downstream side of the battery chiller 252 in the flow direction of the refrigerant and a refrigerant outlet connected to the compressor 210. In addition, the accumulator 260 may separate the introduced refrigerant into a liquid-phase refrigerant and a gas-phase refrigerant, and supply only the gas-phase refrigerant to the compressor 210.

The connection block may be a second connection block 280. In addition, the second connection block 280 connects a refrigerant outlet of the third expansion valve 251 and a refrigerant inlet of the battery chiller 252 to each other, such that the refrigerant communicates, and the second connection block 280 connects and communicates a refrigerant outlet of the battery chiller 252 and a refrigerant inlet of the accumulator 260 to and with each other. Here, the third expansion valve 251, the battery chiller 252, and the accumulator 260 are integrally connected to the second connection block 280, such that refrigerant flow paths may communicate with each other, a fixing bracket 221, which is separately formed, may be coupled to the water-cooled condenser 210, and the battery chiller 252 and the accumulator 260 may be coupled and fixed to the fixing bracket 221. Therefore, the water-cooled condenser 220, the third expansion valve 251, the battery chiller 252, the second connection block 280, and the accumulator 260 may be compactly modularized and formed integrally with each other.

Accordingly, in the thermal management system according to the present invention, a distance between components constituting the refrigerant system is decreased, such that pressure loss of the refrigerant in pipes and blocks connecting the components to each other is decreased, performance of the refrigerant system is improved, and assemblability of the components constituting the refrigerant system is improved.

In addition, in the battery chiller 252, an inlet through which the refrigerant is introduced and an outlet through which the refrigerant is discharged may be formed at a lower side of the battery chiller 252 in a height direction. In addition, the second connection block 280 may be disposed below the third expansion valve 251 in the height direction. In addition, the accumulator 260 may be disposed below the battery chiller 252 and the second connection block 280 in the height direction.

Therefore, the thermal management system according to the present invention may prevent the refrigerant from being accumulated in the battery chiller, and the flow direction of the refrigerant is mostly formed in a direction of gravity, and thus, pressure loss of the refrigerant may be decreased.

In addition, a first connection block 270 connected to an upstream side of the third expansion valve 251 in the flow direction of refrigerant may be disposed above the third expansion valve 251 in the height direction and be coupled to the third expansion valve 251. Although not illustrated here, in a case where the first expansion valve 225 and the air-cooled condenser 230 do not exist, the refrigerant outlet of the water-cooled condenser 220 is directly connected to the first connection block 270, such that the water-cooled condenser 220 may communicate with the third expansion valve 251 through the first connection block 270.

In addition, the thermal management system according to an embodiment of the present invention may be configured to further include a second expansion valve 240 and an evaporator 242. In addition, the first connection block 270 may be configured to connect a refrigerant outlet of the air-cooled condenser 230 to a refrigerant inlet of the third expansion valve 251 and a refrigerant inlet of the second expansion valve 240.

Here, the first connection block 270 may be connected to the downstream side of the air-cooled condenser 230 in the flow direction of the refrigerant, a refrigerant line may be branched into two refrigerant lines in the first connection block 270, one refrigerant line may be configured to be connected to the evaporator 242, and the other refrigerant line may be configured to be connected to the battery chiller 252.

The second expansion valve 240 may serve to throttle or pass the refrigerant or block a flow of the refrigerant. In addition, the second expansion valve 240 may be configured in parallel with the third expansion valve 251. That is, the second expansion valve 240 may be connected to one of the two refrigerant lines branched in the first connection block 270 and the third expansion valve 251 is connected to the other of the two refrigerant lines. In this case, the second expansion valve 240 may be disposed on an upstream side of the evaporator 242 in the flow direction of the refrigerant, and the third expansion valve 251 may be disposed on an upstream side of the battery chiller 252.

The evaporator 242 is disposed on a downstream side of the second expansion valve 240 in the flow direction of the refrigerant, and is provided inside an air conditioner 150 of a vehicle, and air flowing by a blower 152 of the air conditioner may be cooled while passing through the evaporator 242 and supplied to the interior of the vehicle to be used for interior cooling of the vehicle.

In addition, therefore, the second expansion valve 240 and the evaporator 242 form one set, and the third expansion valve 251 and the battery chiller 252 form another set, such that two sets are configured in parallel on the refrigerant lines. In addition, the refrigerant lines may be joined to downstream sides of the evaporator 242 and the battery chiller 252 in the flow direction of the refrigerant to be formed as a single coolant line and be connected to the accumulator 260.

Therefore, in the thermal management system according to the present invention, in a case where the refrigerant system is configured to include the battery chiller and the evaporator, a distance between the components constituting the refrigerant system may be decreased through the first connection block. Accordingly, pressure loss of the refrigerant in pipes and blocks connecting the components to each other may be decreased, and assemblability of the components constituting the refrigerant system may be improved.

In addition, the thermal management system according to an embodiment of the present invention may further include an internal heat exchanger 233. The internal heat exchanger 233 serves to exchange heat between the refrigerant introduced into the second expansion valve 240 and the refrigerant discharged from the evaporator 242 to improve cooling performance. Here, the internal heat exchanger 233 is configured so that the refrigerant line connecting the first connection block 270 and the second expansion valve 240 to each other passes therethrough and the refrigerant line connecting the evaporator 242 and the accumulator 260 to each other passes therethrough, such that heat exchange between the refrigerant before being introduced into the second expansion valve 240 and the refrigerant after passing through the evaporator 242 may occur in the internal heat exchanger 233. Therefore, the refrigerant may be further cooled before being introduced into the second expansion valve 240, cooling performance through the evaporator 242 may be improved, and efficiency of the refrigerant system may be improved, by the internal heat exchanger 233.

In addition, the thermal management system according to an embodiment of the present invention may further include a coolant system 300. The refrigerant system 200 may be configured to circulate the refrigerant to cool the interior, and the coolant system 300 may be configured to circulate a coolant to heat the interior and cool the components. In addition, the coolant system 300 may include a heating line 301 for interior heating and a cooling line 302 for cooling the electronic component 460 and the battery 350.

Here, the refrigerant system 200 may include the compressor 210, the water-cooled condenser 220, the first expansion valve 225, the air-cooled condenser 230, the first connection block 270, the second expansion valve 240, the evaporator 242, the internal heat exchanger 233, the accumulator 260, the third expansion valve 251, the second connection block 280, and the battery chiller 252.

In addition, the heating line 301 in the coolant system 300 may include the water-cooled condenser 220, a first coolant pump 450, a coolant heater 430, a heater core 440, and a first directional selector valve 410.

As described above, the refrigerant and the coolant may exchange heat with each other while passing through the water-cooled condenser 220. The first coolant pump 450 is a means pumping the coolant so that the coolant is circulated along the heating line 301, and may be disposed on a downstream side of the water-cooled condenser 220 in a flow direction of the coolant and be installed on a coolant line. The coolant heater 430 is a device heating the coolant, and may be disposed on and connected to a downstream side of the first coolant pump 450 and an upstream side of the heater core 440 in the flow direction of the coolant. The heater core 440 may be disposed in the air conditioner 150 of the vehicle, and may be disposed on and connected to a downstream side of the coolant heater 430 in the flow direction of the coolant. The first directional selector valve 410 may be installed between the heater core 440 and the water-cooled condenser 220, and may be configured to selectively connect the heating line 301 and a cooling line 302 to be described later to each other or block the connection between the heating line 301 and the cooling line 302. In more detail, the first directional selector valve 410 may be installed on the heating line 301, two coolant line pipes may be connected to the first directional selector valve 410, one first connection line 302-1 branched from one side of the cooling line 302 may be connected to the first directional selector valve 410, and one second connection line 302-2 branched from the other side of the cooling line 302 may be connected to the first directional selector valve 410 That is, at the first directional selector valve 410, four coolant lines may be connected to each other so as to meet, and the first directional selector valve 410 may be a four-way selector valve capable of controlling a state in which the four coolant lines are connected to each other or the connection between the four coolant lines is blocked.

In addition, in the coolant system 300, the cooling line 302 may include an electric radiator 310, a reservoir tank 370, a second directional selector valve 320, a second coolant pump 420, the first directional selector valve 410, the electronic component 460, a first coolant joint 313, a second coolant joint 312, a third coolant pump 340, the battery 350, the battery chiller 252, and a third directional selector valve 330. The electric radiator 310 is a radiator cooling the coolant heat-exchanged with the electronic component 460 or the battery 350, and may be cooled in an air-cooled manner by a cooling fan 311. The reservoir tank 370 may serve to store the coolant and replenish the coolant line in which the coolant is insufficient with the coolant, and may be installed on a coolant line in front of the second coolant pump 420 and the third coolant pump 340 in the flow direction of the coolant. The second directional selector valve 320 may be installed on the cooling line 302, two coolant pipes may be connected to the second directional selector valve 320, and the first directional selector valve 410 and the second directional selector valve 320 may be connected to each other by the first connection line 302-1 so that the heating line 301 and the cooling line 302 are connected to each other. That is, at the second directional selector valve 320, three coolant lines may be connected to each other so as to meet, and the second directional selector valve 320 may be a three-way selector valve capable of controlling a state in which the three coolant lines are connected to each other or the connection between the three coolant lines is blocked. The second coolant pump 420 is a means pumping the coolant so that the coolant is circulated along the cooling line 302. In addition, the second coolant pump 420 may be installed on the first connection line 302-1 between the first directional selector valve 410 and the second directional selector valve 320, and the coolant may flow from the second directional selector valve 320 toward the first directional selector valve 410 by an operation of the second coolant pump 420. The first directional selector valve 410 is the same as described in the above-described heating line 301. The electronic component 460 may be disposed on the second connection line 302-2 connecting the first directional selector valve 410 and the second coolant joint 312 to each other, and may be cooled by the coolant. In addition, the electronic component 460 may be a driving motor, an inverter, an on-board charger (OBC), or the like. The third coolant pump 340 is a means pumping the coolant so that the coolant is circulated along the cooling line 302. In addition, the third coolant pump 340 is installed in a coolant line between the first coolant joint 313 and the battery 350, and the coolant may flow from the third coolant pump 340 toward the battery 350. The battery 350 is a power source of the vehicle, and may be a driving source of various electronic components 460 in the vehicle. Alternatively, the battery 350 may serve to store electricity by being connected to a fuel cell or may serve to store electricity supplied from the outside. In addition, the battery 350 may be disposed on a coolant line between the third coolant pump 340 and the third directional selector valve 330. Therefore, the battery 350 may be cooled or heated by exchanging heat with the flowing coolant. The first coolant joint 313 is installed on a coolant line behind the second directional selector valve 320 in the flow direction of the coolant, and at the first coolant joint 313, three coolant lines are connected to each other so as to meet. That is, the first coolant joint 313 is installed so that both sides thereof are connected to the cooling line 302, and a third connection line 302-3 may be connected to a lower side of the first coolant joint 313. Here, the third connection line 302-3 may be connected to the first coolant joint 313 so as to pass through the battery chiller 252. The second coolant joint 312 may be installed at a point where a rear end of the second connection line 302-2 meets the cooling line 302, and at the second coolant joint 312, three coolant lines are connected to each other so as to meet. That is, the second coolant joint 312 is installed so that both sides thereof are connected to the cooling line 302, and the second connection line 302-2 may be connected to an upper side of the second coolant joint 312. The battery chiller 252 is the same as described in the above-described heating line 301. The third directional selector valve 330 is installed on a coolant line between the battery 350 and the second coolant joint 312, two coolant pipes are connected to the third directional selector valve 330, and the third connection line 302-3 is connected to an upper side of the third directional selector valve 330, such that the battery 350 and the third connection line 302-3 may be configured to be connected to each other in parallel. In this case, the second directional selector valve 320 may be a three-way selector valve capable of controlling a state in which three coolant lines are connected to each other or the connection between the three coolant lines is blocked.

In addition, the air conditioner 150 has the blower 152 installed on one side thereof so as to blow air, and a temperature control door 151 may be installed inside the air conditioner 150. In addition, the evaporator 242 and the heater core 440 disposed in the air conditioner may be disposed and configured so that the air discharged from the blower 152 may pass through only the evaporator 242 and be then introduced into the interior or pass through the evaporator 242, pass through the heater core 440, and be then introduced into the interior, according to an operation of the temperature control door 151.

Hereinafter, a configuration of the refrigerant system in the thermal management system according to an embodiment of the present invention described above will be described in more detail.

Figure 7:
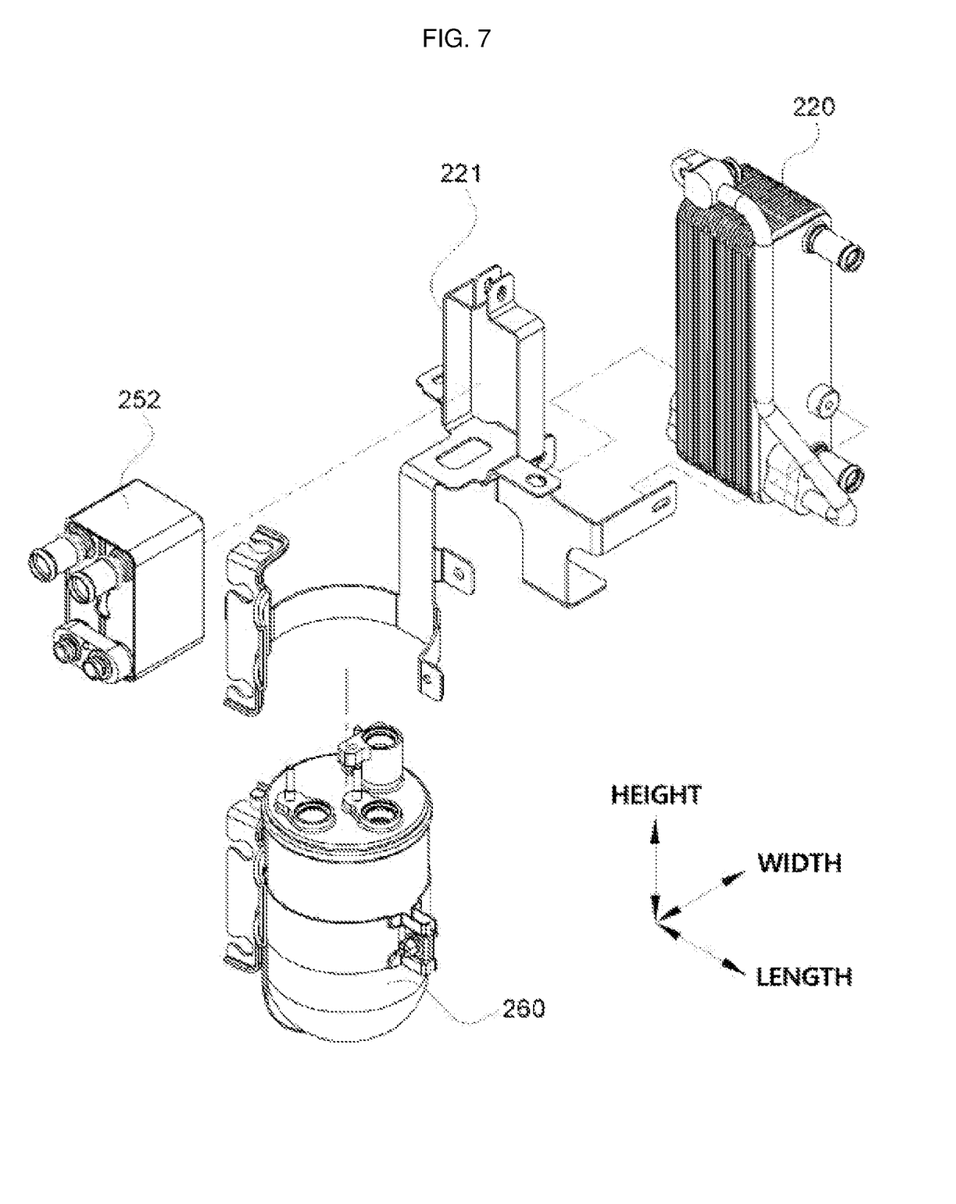
FIG. 7 is an exploded perspective view illustrating a coupled structure of a water-cooled condenser, a fixing bracket, a battery chiller, and an accumulator of the refrigerant module in the thermal management system according to an embodiment of the present invention.
Figure 8:
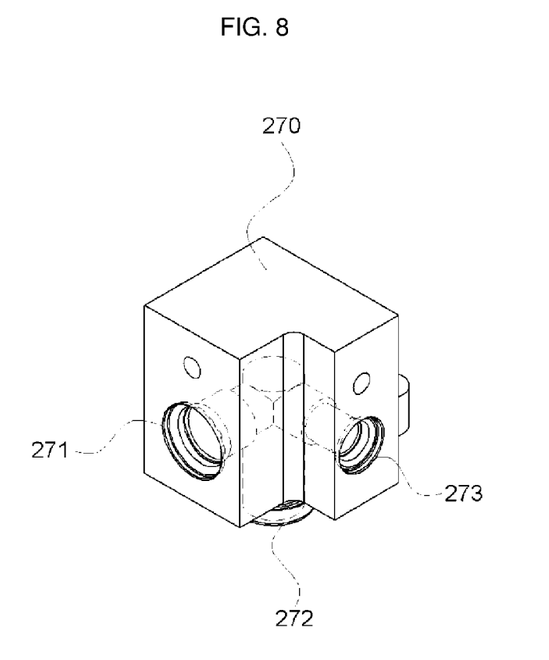
FIGS. 8 and 9 are perspective views illustrating a first connection block and a second connection block of the refrigerant module in the thermal management system according to an embodiment of the present invention.
Figure 9:
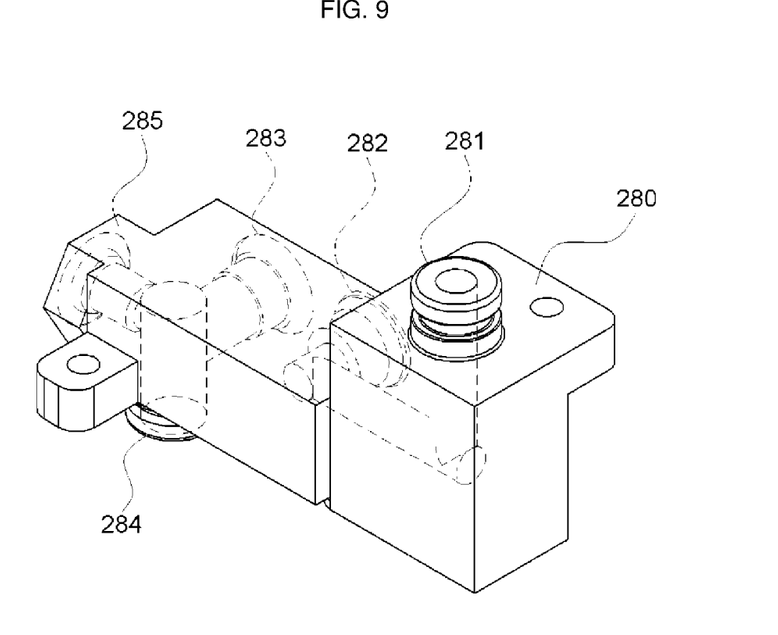

FIGS. 3 to 6 are assembled perspective views, an exploded perspective view, and a right side view illustrating a refrigerant module of the thermal management system according to an embodiment of the present invention, FIG. 7 is an exploded perspective view illustrating a coupled structure of a water-cooled condenser, a fixing bracket, a battery chiller, and an accumulator of the refrigerant module in the thermal management system according to an embodiment of the present invention, and FIGS. 8 and 9 are perspective views illustrating a first connection block and a second connection block of the refrigerant module in the thermal management system according to an embodiment of the present invention.

As illustrated in the drawings, in the thermal management system according to an embodiment of the present invention, the refrigerant system may include the water-cooled condenser 220, the battery chiller 252, the third expansion valve 251, the first connection block 270, the accumulator 260, and the second connection block 280. In addition, the refrigerant system according to the present invention may further include the first expansion valve 225 and a connection pipe 222.

Figure 5:
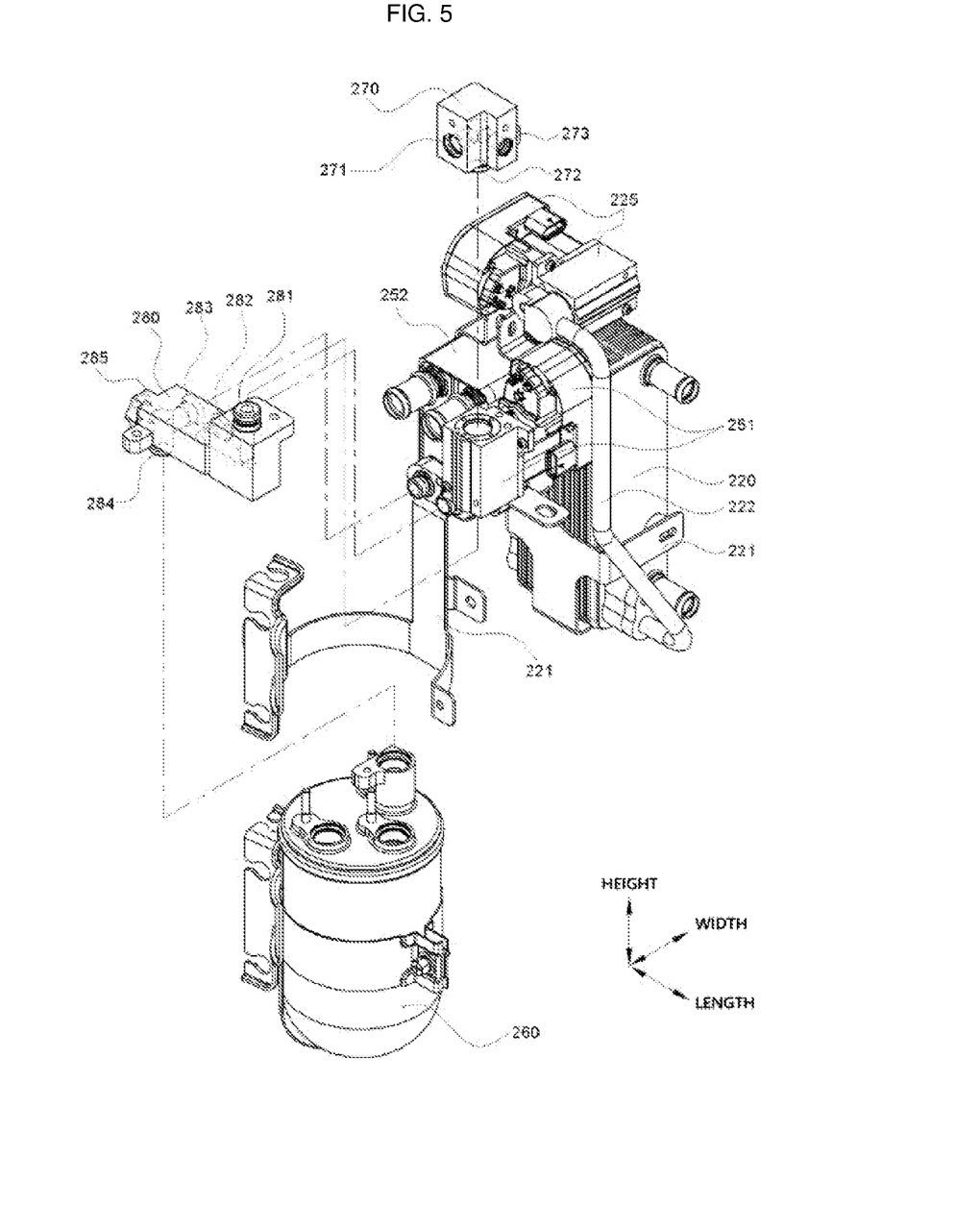
FIG. 5 is an exploded perspective view illustrating the refrigerant module of the thermal management system according to an embodiment of the present invention.
Figure 6:
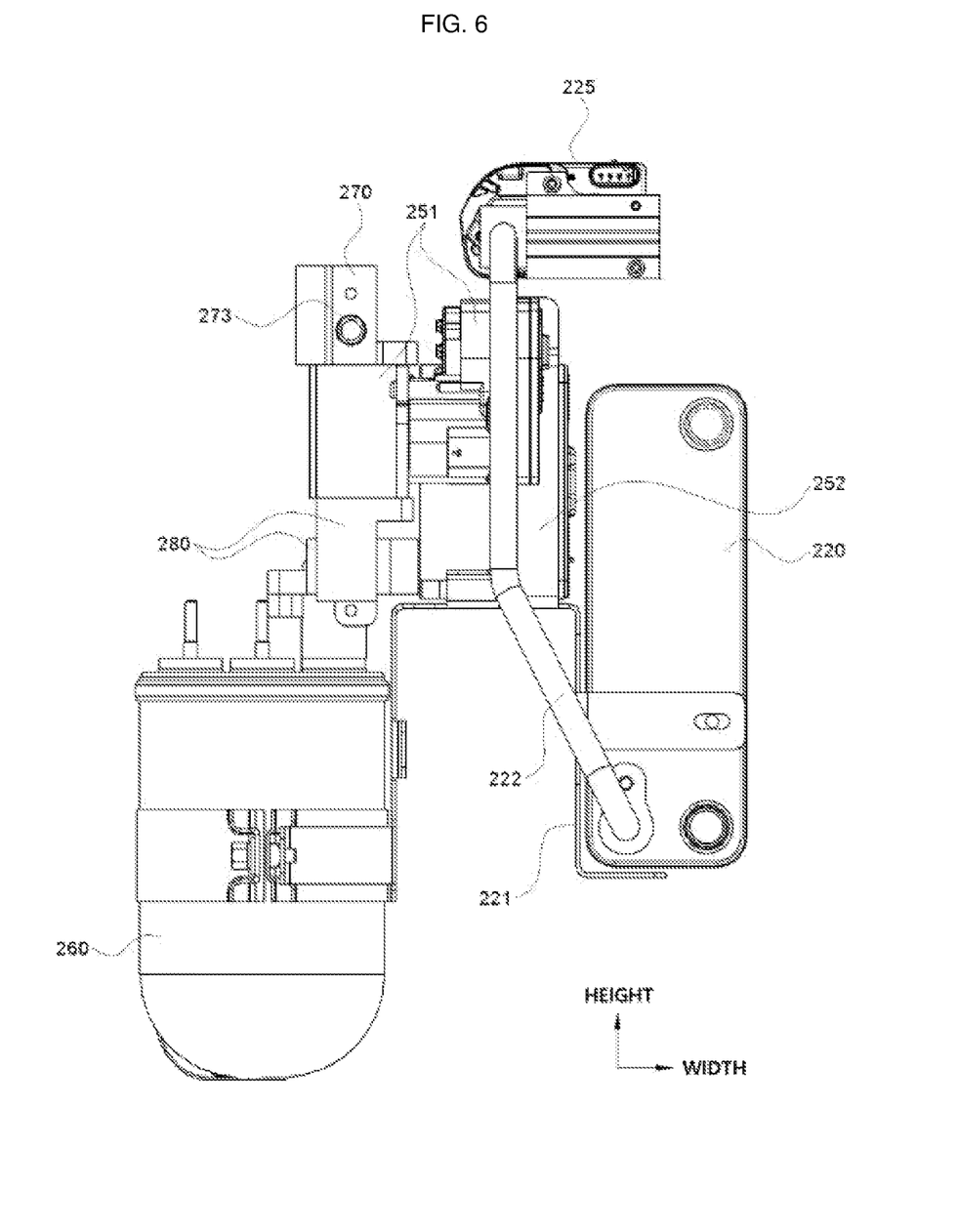
FIG. 6 is a right side view illustrating the refrigerant module of the thermal management system according to an embodiment of the present invention.

The water-cooled condenser 220 may be formed in a rectangular parallelepiped shape, and be formed to be elongated in the height direction. In addition, the water-cooled condenser 220 may have a coolant inlet and a coolant outlet formed on a right side surface thereof in a length direction, a refrigerant inlet formed on a lower side of a left side surface thereof in the length direction, and a refrigerant outlet formed on a lower side of the right side surface thereof in the length direction.

The battery chiller 252 is formed in a rectangular parallelepiped shape and is provided on a side surface of the water-cooled condenser 220, and may be disposed on a side surface of the water-cooled condenser 220 on which the coolant inlet, the coolant outlet, the refrigerant inlet, and the refrigerant outlet are not formed. That is, as illustrated in the drawings, the battery chiller 252 may be disposed on a front surface of the water-cooled condenser 220 in a width direction. In addition, a refrigerant inlet, a refrigerant outlet, a coolant inlet, and a coolant outlet of the battery chiller 252 may be formed on the front surface of the battery chiller 252 in the width direction, which is an opposite surface to a surface on which the battery chiller 252 faces the water-cooled condenser 220. In this case, the refrigerant inlet and the refrigerant outlet may be formed on a lower side with respect to the center of the battery chiller 252 in the height direction, the coolant inlet and the coolant outlet may be formed on an upper side with respect to the center of the battery chiller 252 in the height direction. In addition, the fixing bracket 221, which is separately formed, may be coupled to the water-cooled condenser 220, and the battery chiller 252 may be coupled to and fixed to the fixing bracket 221.

Similar to the battery chiller 252, the third expansion valve 251 is provided on a side surface of the water-cooled condenser 220 and may be disposed on a side surface of the water-cooled condenser 220 on which the coolant inlet, the coolant outlet, the refrigerant inlet, and the refrigerant outlet are not formed. That is, as illustrated in the drawings, the third expansion valve 251 may be disposed on the front surface of the water-cooled condenser 220 in the width direction. In addition, the third expansion valve 251 may be disposed on a right side surface of the battery chiller 252 in the length direction. In addition, the third expansion valve 251 may have a refrigerant inlet formed on an upper surface thereof and a refrigerant outlet formed on a lower surface thereof, and may be disposed so that the refrigerant inlet faces upward in the height direction and the refrigerant outlet faces downward in the height direction. Here, the third expansion valve 251 may be coupled and fixed to the battery chiller 252 by a second connection block 280 to be described below.

The first connection block 270 may be disposed on an upper side of the third expansion valve 251. In addition, the first connection block 270 has a first port 271, a second port 272, and a third port 273 formed therein, and these three ports may communicate with each other through a refrigerant flow path passing through the first connection block 270. In addition, the first port 271 through which the refrigerant is introduced may be formed on one side surface of the first connection block 270, the second port 272 through which the refrigerant is discharged may be formed on a lower surface of the first connection block 270, and the third port 273 through which the refrigerant is discharged may be formed on a side surface of the first connection block 270 different from the side surface on which the first port 271 is formed. That is, the first connection block 270 may be disposed so that the first port 271 faces forward in the width direction, the second port 272 faces downward in the height direction, and the third port 273 faces rightward in the length direction. In addition, the second port 272 may be connected to the refrigerant inlet of the third expansion valve 251, and the first connection block 270 may be coupled to and fixed to the third expansion valve 251.

The accumulator 260 may be adjacent to a refrigerant outlet side of the battery chiller 252 and be provided on a lower side of the battery chiller 252. That is, as illustrated in the drawings, the accumulator 260 may be disposed in front of the battery chiller 252 in the width direction and on the lower side of the battery chiller 252 in the height direction so that a refrigerant inlet of the accumulator 260 is adjacent to the refrigerant outlet side of the battery chiller 252. In addition, the accumulator 260 may have two refrigerant inlets and one refrigerant outlet formed on an upper surface thereof, may be coupled to and fixed to the battery chiller 252 by a second connection block 280 to be described below, and may be coupled and fixed to the fixing bracket 221 coupled to and fixed to the water-cooled condenser 220. In addition, the accumulator 260 may be disposed adjacent to the second connection block 280 so that the refrigerant inlet faces a fourth port 284 through which the refrigerant is discharged from the second connection block 280.

The second connection block 280 may be disposed on a lower side of the third expansion valve 251. In addition, the second connection block 280 has a first port 281, a second port 282, a third port 283, and a fourth port 284 formed therein, and the first port 281 and the second port 282 communicate with each other and the third port 283 and the fourth port 284 communicate with each other, through refrigerant flow paths penetrating through the second connection block 280. In this case, the first port 281 and the second port 282 may be formed so as not to communicate with the third port 283 and the fourth port 284. In addition, the first port 281 through which the refrigerant is introduced may be formed on an upper surface of the second connection block 280, and the second port 282 communicating with the first port 281 may be formed on a side surface of the second connection block 280 facing the battery chiller 252. In addition, the third port 283 through which the refrigerant is introduced may be formed on the side surface of the second connection block 280 facing the battery chiller 252, similar to the second port 282, and the fourth port 284 communicating with the third port 283 may be formed on a lower surface of the second connection block 280. In more detail, the first port 281 is formed on an upper surface of a right end portion of the second connection block 280 in the length direction, the second port 282 and the third port 283 are formed on a rear surface of the second connection block 280 in the width direction, and the third port 283 is formed on a left side of the second port 282. In addition, the fourth port 284 is formed on a lower surface of a left end portion of the second connection block 280 in the length direction. In addition, the first port 281 is connected to the refrigerant outlet of the third expansion valve 251, the second port 282 is connected to the refrigerant inlet of the battery chiller 252, the third port 283 is connected to the refrigerant outlet of the battery chiller 252, and the fourth port 284 is connected to the refrigerant inlet of the accumulator 260. In addition, the second connection block 280 may be coupled and fixed to the battery chiller 252 and the accumulator 260. In addition, a sensor mounting part 285 may be formed on a left side surface of the second connection block 280 in the length direction so as to be connected to an internal refrigerant flow path connecting the third port 283 and the fourth port 284 to each other, and a PT sensor measuring a pressure and a temperature of the refrigerant may be installed in the sensor mounting part 285. Therefore, the pressure and the temperature of the refrigerant flowing from the battery chiller 252 toward the accumulator 260 may be measured.

Here, the refrigerant may be introduced into the first port 271 of the first connection block 270, and the introduced refrigerant flows toward the second port 272 of the first connection block 270, passes through the third expansion valve 251, and is then introduced into the first port 281 of the second connection block 280. The refrigerant introduced into the second connection block 280 flows toward the second port 282, passes through the battery chiller 252, is introduced into the third port 283 of the second connection block 280, and is then introduced into the accumulator 260 through the fourth port 284.

Therefore, in the thermal management system according to an embodiment of the present invention, the water-cooled condenser 220, the battery chiller 252, the third expansion valve 251, the first connection block 270, the accumulator 260, and the second connection block 280 may be modularized and formed integrally with each other.

Accordingly, in the refrigerant system according to the present invention, a distance between components constituting the refrigerant system for interior cooling of the vehicle and cooling of the electronic components is decreased, such that pressure loss of the refrigerant in pipes and blocks connecting the components to each other is decreased, performance of the refrigerant system is improved, and assemblability of the components constituting the refrigerant system is improved. In addition, the refrigerant may be prevented from being accumulated in the battery chiller, and assemblability between the battery chiller and the accumulator may be improved.

In addition, the refrigerant system 200 according to the present invention may further include the first expansion valve 225 and the connection pipe 222. The first expansion valve 225 may be provided on an upper side of the water-cooled condenser 220 in the height direction and be disposed at a position spaced apart from an upper surface of the water-cooled condenser 220 upward in the height direction. In addition, the first expansion valve 225 may be formed so that a refrigerant inlet through which the refrigerant is introduced faces forward in the width direction and a refrigerant outlet through which the refrigerant is discharged faces rearward in the width direction. The connection pipe 222 may be a pipe made of a metal, and may have one end connected and coupled to the refrigerant outlet of the water-cooled condenser 220 and the other end connected and coupled to the refrigerant inlet of the first expansion valve 225.

Therefore, in the thermal management system according to an embodiment of the present invention, the water-cooled condenser 220, the battery chiller 252, the third expansion valve 251, the first connection block 270, the accumulator 260, the second connection block 280, the first expansion valve 225, and the connection pipe 222 may be modularized and formed integrally with each other.

In addition, the refrigerant outlet of the first expansion valve 225 may be connected to the refrigerant inlet of the air-cooled condenser 230 by a pipe, and the first port 271, which is the refrigerant inlet of the first connection block 270, may be connected to the refrigerant outlet of the air-cooled condenser 230 by a pipe.

In addition, the refrigerant inlet of the water-cooled condenser 220 may be connected to the refrigerant outlet of the compressor 210 by a pipe, and the refrigerant outlet of the accumulator 260 may be connected to the refrigerant inlet of the accumulator 260 by a pipe.

In addition, the third port 273, which is the refrigerant outlet of the first connection block 270, may be connected to the refrigerant inlet of the second expansion valve 240 by a pipe, and the refrigerant outlet of the second expansion valve 240 may be connected to the refrigerant inlet of the evaporator 242. In addition, the refrigerant outlet of the evaporator 242 may be connected to the refrigerant inlet of the accumulator 260 by a pipe. Here, a pipe connecting the first connection block 270 and the second expansion valve 240 to each other and a pipe connecting the evaporator 242 and the accumulator 260 to each other are connected to the internal heat exchanger 233, such that the refrigerant flowing from the first connection block 270 to the second expansion valve 240 and the refrigerant flowing from the evaporator 242 to the accumulator 260 may exchange heat with each other in the internal heat exchanger 233.

The present invention is not limited to the embodiments described above, and may be applied to various fields. In addition, the present invention may be variously modified by those skilled in the art to which the present invention pertains without departing from the gist of the present invention claimed in the claims.

DETAILED DESCRIPTION OF MAIN ELEMENTS

150: air conditioner, 151: temperature control door
152: blower
200: refrigerant system, 210: compressor
220: water-cooled condenser, 221: fixing bracket
222: connection pipe, 225: first expansion valve
230: air-cooled condenser, 233: internal heat exchanger
240: second expansion valve, 242: evaporator
251: third expansion valve, 252: battery chiller
260: accumulator
270: first connection block, 271: first port
272: second port, 273: third port
280: second connection block, 281: first port
282: second port, 283: third port
284: fourth port, 285: sensor mounting part
300: coolant system, 301: heating line
302: cooling line, 302-1: first connection line
302-2: second connection line, 302-3: third connection line
310: electric radiator, 311: cooling fan
312: second coolant joint, 313: first coolant joint
320: second-directional selector valve, 330: third-directional selector valve
340: third coolant pump, 350: battery
370: reservoir tank
410: first directional selector valve, 420: second coolant pump
430: coolant heater, 440: heater core
450: first coolant pump, 460: electronic component

The invention claimed is:

1. A thermal management system comprising:
a first heat exchanger heat-exchanging a heat exchange medium introduced from a compressor;
an expansion valve expanding the heat exchange medium introduced from the first heat exchanger;
a second heat exchanger exchanging heat between the heat exchange medium introduced from the expansion valve and a heating component;
an accumulator storing the heat exchange medium introduced from the second heat exchanger and supplying the heat exchange medium to the compressor;
a connection block connecting a heat exchange medium outlet of the expansion valve and a heat exchange medium inlet of the second heat exchanger to each other and connecting a heat exchange medium outlet of the second heat exchanger and a heat exchange medium inlet of the accumulator to each other;
another expansion valve expanding the heat exchange medium introduced from the first heat exchanger; and
an evaporator heat-exchanging the heat exchange medium introduced from another expansion valve with air supplied to an interior and sending the heat exchange medium to the accumulator.

2. The thermal management system of claim 1, wherein the heating component includes a battery or an electronic component, and
the second heat exchanger cools or heats the heating component.

3. The thermal management system of claim 1, wherein the connection block connects and communicates three or more components to and with each other.

4. The thermal management system of claim 1, wherein the first heat exchanger, the expansion valve, the second heat exchanger, the accumulator, and the connection block are modularized and formed integrally with each other.

5. The thermal management system of claim 1, wherein an inlet through which the heat exchange medium is introduced and an outlet through which the heat exchange medium is discharged are formed on a lower side of the second heat exchanger in a height direction.

6. The thermal management system of claim 1, wherein the connection block is disposed below the expansion valve in a height direction.

7. The thermal management system of claim 1, wherein the accumulator is disposed below the second heat exchanger and the connection block in a height direction.

8. The thermal management system of claim 1, further comprising
another connection block connecting a heat exchange medium outlet of the first heat exchanger and an inlet of the expansion valve to each other.

9. The thermal management system of claim 1, wherein a refrigerant flow path penetrating an interior of the connection block is formed,
a sensor mounting part connected to the refrigerant flow path is formed in the connection block,
a sensor can be installed in the sensor mounting part.

10. The thermal management system of claim 1, further comprising
another connection block connecting a heat exchange medium outlet of the first heat exchanger to an inlet of the first expansion valve and an inlet of a second expansion valve.

11. The thermal management system of claim 10, wherein the first heat exchanger includes:
a water-cooled condenser primarily heat-exchanging the heat exchange medium discharged from the compressor with a coolant; and
an air-cooled condenser secondarily heat-exchanging the heat exchange medium firstly heat-exchanged while passing through the water-cooled condenser with external air.

12. The thermal management system of claim 11, further comprising
the second expansion valve connected between the water-cooled condenser and the air-cooled condenser, expanding the heat exchange medium discharged from the water-cooled condenser, and sending the expanded heat exchange medium to the air-cooled condenser.

13. The thermal management system of claim 10, further comprising
an internal heat exchanger exchanging heat between the heat exchange medium flowing from another connection block to the second expansion valve and the heat exchange medium flowing from the evaporator to the accumulator.

* * * * *